United States Patent [19]

Nordskog

[11] Patent Number: 4,867,993

[45] Date of Patent: Sep. 19, 1989

[54] DISPOSABLE BEVERAGE BREWING CHAMBER

[76] Inventor: Robert A. Nordskog, 18135 Karen Dr., Tarzana, Calif. 91356

[21] Appl. No.: 153,698

[22] Filed: Feb. 8, 1988

[51] Int. Cl.$^4$ .............................................. B65D 85/00
[52] U.S. Cl. .......................................... 426/77; 426/82; 426/110; 426/111; 426/112; 99/295; 99/306
[58] Field of Search ....................................... 426/77–84, 426/433, 111; 99/295, 306, 304, 290, 284, 322, 317

[56] References Cited

U.S. PATENT DOCUMENTS

| | | | |
|---|---|---|---|
| D. 225,077 | 11/1972 | Martin et al. | |
| D. 286,006 | 10/1986 | Kataoka | |
| 1,412,388 | 4/1922 | Clermont | 426/112 |
| 2,383,144 | 8/1945 | Moore | 99/284 |
| 2,615,384 | 10/1952 | Ranz | 99/295 |
| 2,732,787 | 1/1956 | Osborne | 99/295 |
| 2,791,367 | 5/1957 | Mefford | 426/111 |
| 2,822,273 | 2/1958 | Anderson | 99/295 |
| 2,899,310 | 8/1959 | Dale | 99/295 |
| 3,083,101 | 3/1963 | Noury | 426/112 |
| 3,139,344 | 6/1964 | Weisman | 99/295 |
| 3,292,527 | 12/1966 | Stasse | 426/112 |
| 3,401,827 | 9/1968 | Messina | 220/94 A |
| 3,411,431 | 11/1968 | Moerlini et al. | 99/304 |
| 3,434,589 | 3/1969 | Valtri et al. | 206/218 |
| 3,481,501 | 12/1969 | Anderson | 220/94 A |
| 3,566,772 | 3/1971 | Allmon et al. | |
| 3,610,132 | 10/1971 | Martin et al. | 99/295 |
| 3,823,656 | 7/1974 | Vander Veken | 99/295 |
| 4,167,899 | 9/1979 | McCormick | 426/112 |
| 4,389,925 | 6/1983 | Piana | 99/295 |
| 4,471,689 | 9/1984 | Piana | 426/112 |
| 4,520,716 | 6/1985 | Hayes | 99/295 |
| 4,550,024 | 10/1985 | Granse | 426/112 |
| 4,584,101 | 4/1986 | Kataoka | 426/78 |
| 4,656,932 | 4/1987 | Kopp | 99/295 |
| 4,697,503 | 10/1987 | Okabe et al. | 426/82 |
| 4,746,519 | 5/1988 | Wright et al. | 426/112 |

FOREIGN PATENT DOCUMENTS

| | | | |
|---|---|---|---|
| 2327264 | 1/1975 | Fed. Rep. of Germany | 426/77 |
| 3504441 | 8/1986 | Fed. Rep. of Germany | 99/295 |
| 2556323 | 6/1985 | France | 426/77 |
| 1064010 | 4/1967 | United Kingdom | 99/295 |
| 2023086 | 12/1979 | United Kingdom | 206/217 |

Primary Examiner—Steven Weinstein

[57] ABSTRACT

The disposable beverage brewing chamber is usable in a conventional coffee or other hot beverage brewing and dispensing machine and includes a preferably inverted frusto-conical or rectangular container fabricated of paper, paperboard or the like and having a closed bottom with central liquid beverage dispensing aperture therein; closed vertically collapsible sidewalls and an open top defining a central cavity therewith. The cavity contains a filter bag holding brewable ground coffee or tea leaves or shreds or coffee substitute, herbal tea or the like and is positioned against the bottom aperture. Peelable strips may seal the top and bottom aperture. The top includes a single peripheral slide guide rim in the case where the container has a round or oval top, and a pair of slide guide rims at opposite sides where the top is square or rectangular. The sidewalls are accordion pleated or telescopable. The container may include a handle which can be collapsible, as can the rim (s) to provide the chamber with a compact storage configuration.

10 Claims, 2 Drawing Sheets

DISPOSABLE BEVERAGE BREWING CHAMBER

FIELD OF THE INVENTION

The present invention generally relates to beverage brewing means and, more particularly, to an improved disposable brewing chamber for coffee and the like.

PRIOR ART

Various types of devices have been proposed with which to brew coffee, tea and the like. Thus, coffee percolators which have permanent openable chambers containing coffee grounds are commonly used. The grounds must be dumped out and the chambers washed after each brewing. U.S. Pat. No. 3,566,772 employs a disposable cartridge for loading into such percolator to avoid this problem. But the cartridge is bulky and fits only a limited number of machines. Funnels for prepackaged coffee are also known, such as is shown in U.S. Pat. No. Des. 225,077. In such instances, the funnel must be lined with filter paper, then the prepackaged coffee must be torn open and dumped into the funnel and the funnel is then placed in the coffee maker. After brewing, the funnel is removed and the filter and coffee grounds are dumped out and the funnel is cleaned for reuse. This requires much work and is messy.

Disposable coffee filters which fit directly over the user's coffee cup are also known. See, for example, U.S. Pat. No. es. 286,006, and U.S. Pat. No. 3,411,431. But they are useful only with instant type coffee or coffee which otherwise requires little or no refluxing. More complicated devices are illustrated in U.S. Pat. Nos. 4,550,024, 4,471,689, and 4,584,101. Most such devices are also expensive, bulky and of limited utility. Many are of the permanent type which still require flushing out after use.

There remains a need for an improved beverage brewing chamber usable in a conventional coffee or other beverage brewing and dispensing machine. The chamber should be simple, inexpensive, disposable and efficient and of compact, easily stored design. The chamber should be also useful with various brewed beverages such as tea, coffee, herbal tea, coffee substitutes, etc. Such brewing chamber should include the mass of brewable material such as coffee enclosed in a filter, so that all mess is avoided in disposing of the filter and used beverage (mass) grounds and so that time is not wasted opening beverage ground pouches, assembling a filter, pouring the grounds into the filter, etc., before brewing begins.

SUMMARY OF THE INVENTION

The improved disposable beverage brewing chamber of the present invention satisfies all the foregoing needs. The chamber is substantially as set forth in the Abstract. It is directly and immediately insertable into a conventional or other beverage coffee brewing and dispensing machine which heats water and then passes the heated water through a chamber containing the coffee grounds or tea leaves, etc. in a paper filter or the like in order to brew and dispense the beverage such as coffee.

The improved brewing chamber substitutes for the conventional permanent funnel shaped brewing chamber which must first be lined with filter paper and then supplied with loose coffee grounds or tea, etc., from a package or can before inserting it into the beverage maker and brewing it.

Accordingly, the present chamber is rapid and easy to use without mess and clean up. The chamber comprises a collapsible container of paper, paperboard, cardboard or the like having a closed horizontal bottom with a drain aperture vertically therethrough, collapsable closed sidewalls (telescopable or accordion pleated) and an open top defining a central chamber in which ground coffee or other beverage-brewable mass is disposed in a filterbag directly over the drain hole. The chamber top has slide guide side rims and a handle, one or more of which may be collapsible to render the chamber as compact and as easily storable as possible. The chamber may be square, rectangular, inverted frusto-conical in outline or of another suitable configuration and can include peelable closures over the top and bottom drain hole.

Various other features of the improved brewing chamber of the present invention are set forth in the following detailed description and accompanying drawings.

DETAILED DESCRIPTION

Figure 1:
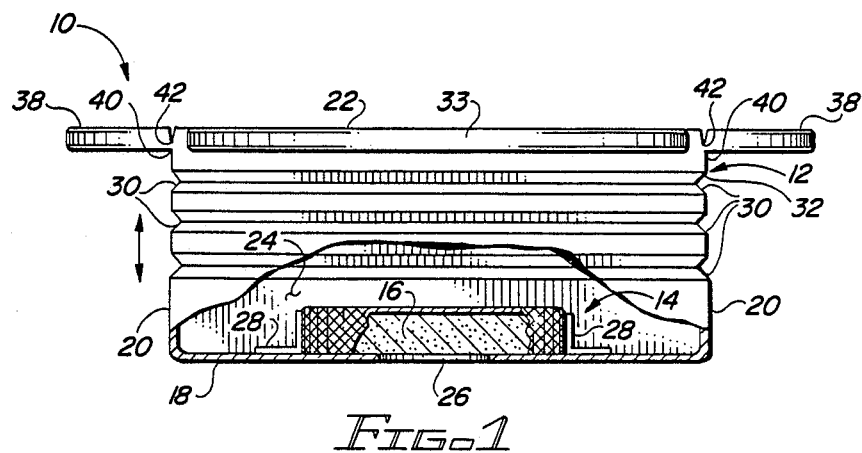
FIG. 1 is a schematic side elevation, partly broken away and partly in section, of a first preferred embodiment of the improved beverage brewing chamber of the present invention, shown in the open operative position.
Figure 2:
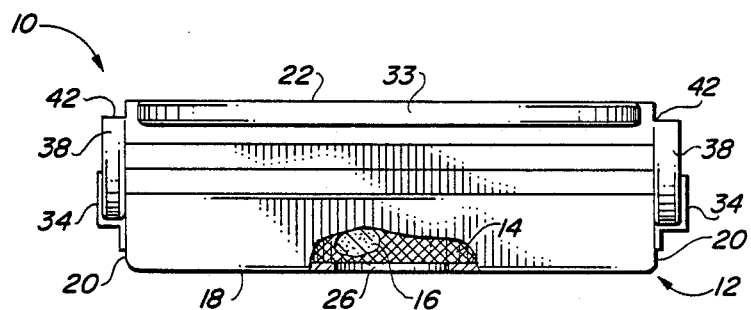
FIG. 2 is a schematic side elevation, partly broken away, of the chamber of FIG. 1 in the collapsed storage position.
Figure 3:
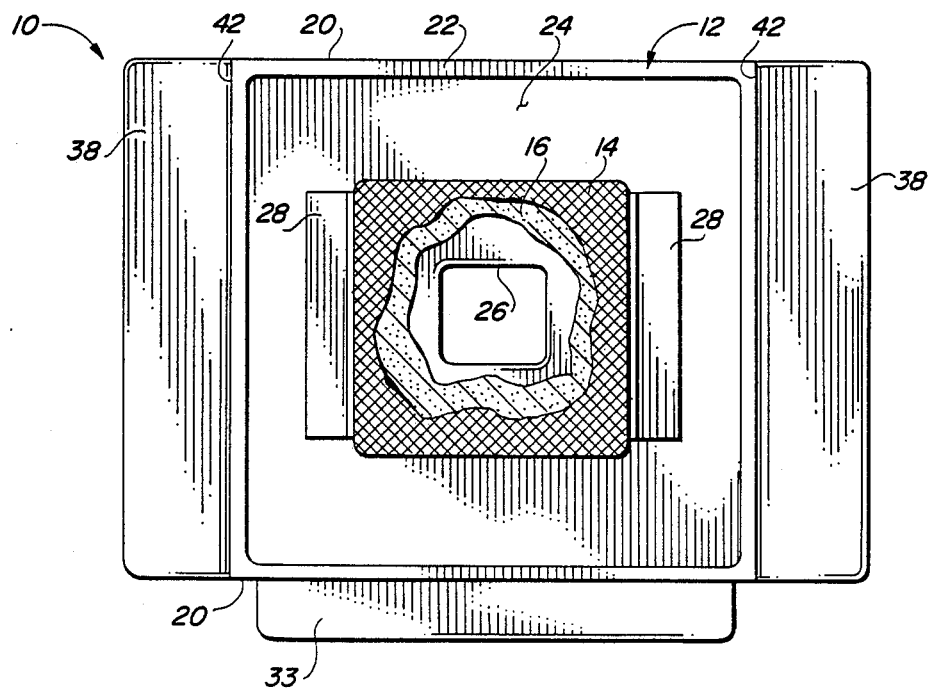
FIG. 3 is a schematic top plan view, partly broken away, of the chamber of FIG. 1.

FIGS. 1, 2 and 3

Now referring more particularly to FIGS. 1, 2 and 3 of the accompanying drawings, a first preferred embodiment of the improved disposable beverage brewing chamber of the present invention is schematically depicted therein. Thus, chamber 10 is shown, which comprises a generally rectangular container 12 holding a filter bag 14 containing a mass 16 of ground brewable coffee, or tea, or a coffee substitute or the like therein.

Container 12 is disposable and is preferably fabricated of paper, paperboard, cardboard or the like. It has a generally horizontal closed bottom 18 integrally connected to four generally vertical closed sidewalls generally designated 20, defining an open top 22 and a central storage cavity 24 communicating therewith. Bottom 18 is provided with a square-sloped vertical drain hole 26 in communication with cavity 24.

Filter bag 14 may be square, rectangular or the like and made of cloth, paper or the like. It encloses a mass of brewable substitute, in this instance, coffee grounds. Bag 14 is secured to bottom 18, as by adhesive strips 28 directly over drain hole 26 so that water which enters cavity 24 during brewing must exit container 12 through drain hole 26 only after passing through bag 14 and mass 16 therein.

Sidewalls 20 bear vertically spaced horizontal accordion pleats 30, in this instance four such pleats 30, in the upper portion 32 thereof, so that sidewalls 20 can move between the collapsed storage position of FIG. 2 and the extended operative position of FIG. 1. Upper portion 32 above pleats 30 bears front handle 33 which may be collapsible, if desired.

The collapsed position of FIG. 2 is the storage-shipping position of chamber 10 before use and is very compact. Chamber 10 may be held in that position, as by removable adhesive strips 34, which engage the lower portion 36 of sidewalls 20 and a pair of collapsible parallel slide guide side rims 38 connected to two opposite sides of top 22 when in the collapsed position in FIG. 2, rather than in the extended operative horizontal slide guide position in FIG. 1. Strips 34 are removed from chamber 10 when it is desired to use chamber 10.

Rims 38 are used to fit into standard guideways (not shown) in a coffee or other similar hot beverage making machine and releasably hold chamber 10 in the proper place therein after chamber 10 is in the deployed operative position of FIG. 1. Rims 38 are hinged at points 40 to top 22 and are also connected thereto by accordion pleats 42.

Thus, chamber 10 is compact for storage and shipping, yet can be fully deployed rapidly and easily for use, containing both the filter bag 14 and brewable coffee grounds 16. When use of chamber 10 is over, it is thrown away, bag 14 and grounds 16 being fully contained therein to avoid a mess and any cleanup. Another chamber 10 is used for the next brewing operation. It will be understood that regular tea leaves, or ground tea leaves or herbal tea components or coffee substitutes can be used in chamber 10, if desired, specifically replacing coffee 16 in bag 14, with comparable results to those described above.

Figure 4:
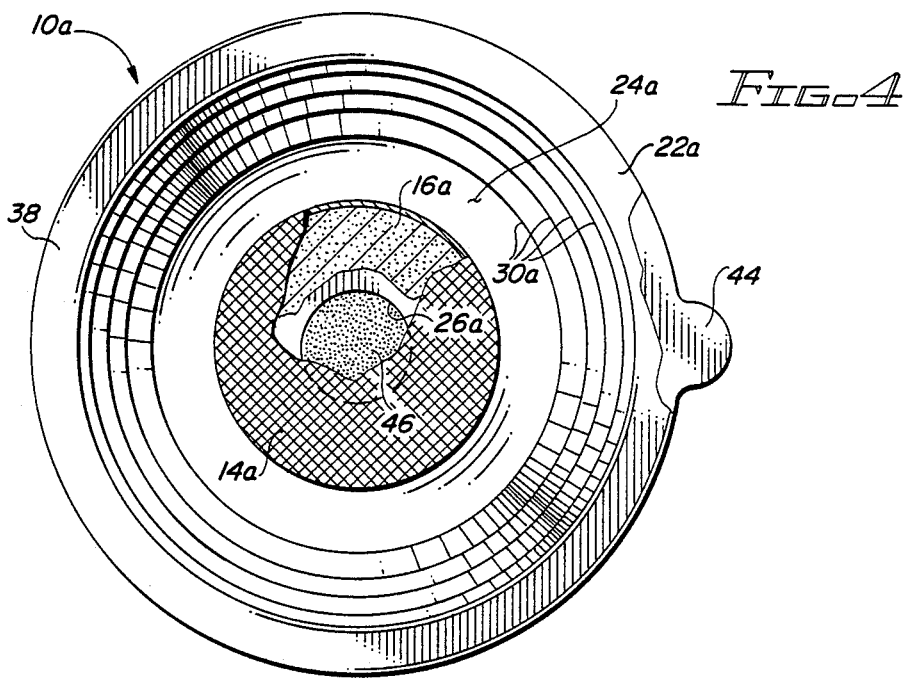
FIG. 4 is a schematic top plan view, partly broken away, of a second preferred embodiment of the improved brewing chamber of the present invention.
Figure 5:
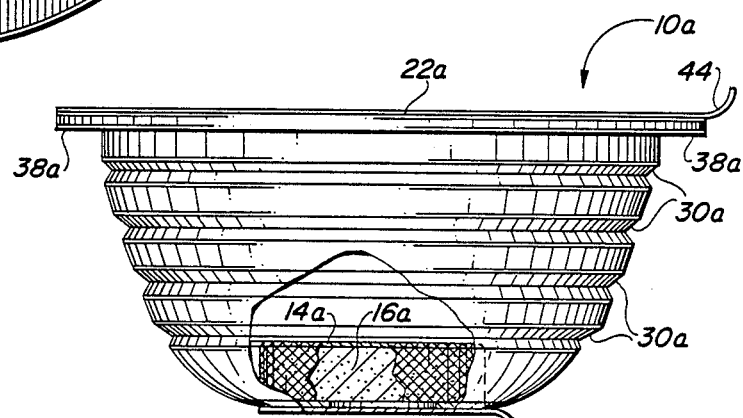
FIG. 5 is a schematic side elevation, partly broken away, of the chamber of FIG. 4 in the operative position, but with seals thereover.
Figure 6:
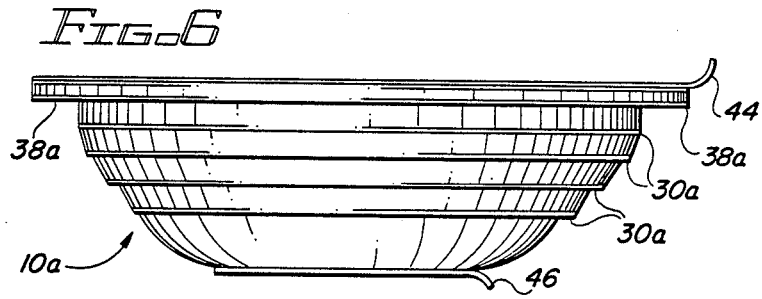
FIG. 6 is a schematic side elevation of the chamber of FIG. 4 in the collapsed storage position; and, FIG. 7 is a schematic side elevation, partly broken away and partly in section, of a third preferred embodiment of the improved brewing chamber of the present invention.

FIGS. 4, 5 and 6

A second preferred embodiment of the improved brewing chamber of the present invention is schematically depicted in FIGS. 4, 5 and 6. Thus, chamber 10a is shown. Components thereof similar to those of chamber 10 bear the same numerals, but are succeeded by the letter "a". Chamber 10a is identical to chamber 10, except as follows:

(a) chamber 10a is inverted frusto-conical or funnel-shaped and circular in top plan view, with a single annular slide guide rim 38a extending outwardly from the periphery of top 22a and serving as a front handle in place of handle 33;
(b) drain hole 26a is circular; and,
(c) top 22a and drain hole 26a are releasably sealed by peelable adhesive strips 44 and 46, respectively.

Chamber 10a has substantially the advantages of chamber 10.

FIG. 7

Figure 7:
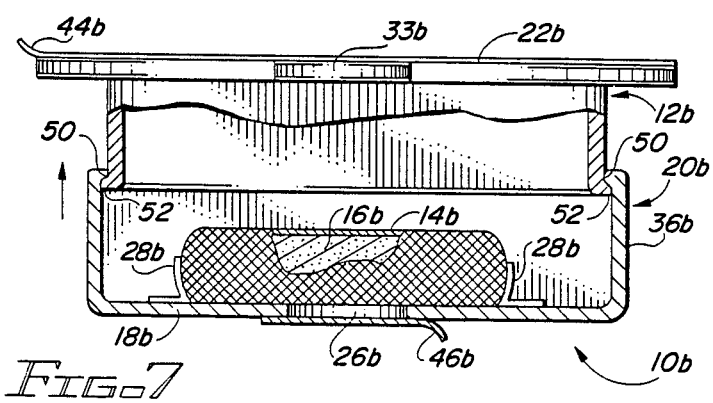

A third preferred embodiment of the improved beverage brewing chamber of the present invention is schematically depicted in FIG. 7. Thus, chamber 10b is shown. Components thereof similar to those of chamber 10 or 10a bear the same numerals but are succeeded by the letter "b". Chamber 10b is identical to chamber 10 except as follows:

(a) removable adhesive strips 44b and 46b cover, respectively, top 22b and drain hole 26b;
(b) handle 33b extends from top 22b, not portion 32b of sidewalls 20b;
(c) there are no pleats in sidewalls 20; instead, portion 36b of sidewalls 20 is integral with bottom 18b, slides telescopingly over upper portion 32b of sidewalls 20b and is linked thereto by detents 50 and 52 on, respectively, the upper inner end of portion 36b and the lower outer end of portion 32b.

Chamber 10b has substantially the advantages of chambers 10 and 10a.

Various modifications, changes, alterations and additions can be made in the improved brewing chamber of the present invention, its components and parameters. All such changes, modifications, alterations and additions as are within the scope of the appended claims form part of the present invention.

What is claimed is:

1. A disposable beverage brewing chamber for use with a coffee brewing device having a hot liquid dispenser means and means for receiving and releasably retaining a filter basket below said dispenser means, said means for receiving including quideways for receiving said filter basket in a substantially horizontal sliding fashion, said chamber comprising, in combination:
    (a) a collapsible container having,
        (i) a closed generally horizontal bottom defining an aperture extending generally vertically therethrough for passage of liquid beverage down therethrough,
        (ii) closed vertically collapsible generally vertical sidewalls integral with and defining with said bottom a central cavity;
        (iii) said sidewalls being constructed of materials so as to be movable from a collapsed pre-operative position wherein said container is compacted into a relatively small volume forming a relatively small central cavity to an operative, expanded position wherein said container presents a relatively large cavity with an attendant relatively large volume; and
        (iv) an open top communicating with said cavity and bearing a generally horizontal outwardly extending peripheral slide guide rim connected to the upper terminus of said sidewalls, said chamber including said slide guide rim being dimensioned sufficient to allow said chamber to be inserted into said coffee brewing device by substantially horizontally sliding said rim along said guideways; and
    (b) a water permeable bag containing a mass of solid brewable beverage material disposed in said cavity against said bottom aperture, said open top and bottom aperture being closed by openable sealing members.

2. The improved brewing chamber of claim 1 wherein said sidewalls are accordion pleated for vertical collapsing to a compact storage condition.

3. The improved brewing chamber of claim 1 wherein said sidewalls vertically telescope, comprising a first set of sidewalls connected to said top and a second set of sidewalls connected to said bottom, said two sets slideably engaged and bearing detent means to prevent separation thereof.

4. The improved brewing chamber of claim 1 wherein at least one of said open top and bottom aperture is releasably closed by an adhesively secured peelable sealing member.

5. The improved brewing chamber of claim 1 wherein said chamber includes a handle and said mass of brewable material is coffee.

6. The improved brewing chamber of claim 5 wherein said slide guide rim is collapsible.

7. The improved brewing chamber of claim 5 wherein said chamber is generally rectangular with slide guide rims at two opposite sides thereof connected to said top.

8. The improved brewing chamber of claim 5 wherein said chamber is generally circular in top plan view and generally inverted frusto-conical in side elevation, with said rim around the entire periphery of said top.

9. The improved brewing chamber of claim 1 wherein said water permeable bag is filter paper and wherei said brew chamber comprises one of paper, paperboard and cardboard, and said brewable mass is coffee.

10. A drip coffee maker having a hot liquid dispenser unit and receiving means for releasably retaining a container with coffee therein below said dispenser unit and containing said disposable beverage brewing chamber set forth in claim 1.

* * * * *